July 22, 1958 — S. JAKOBLITS — 2,844,062
LATHE
Filed April 30, 1956 — 3 Sheets-Sheet 1
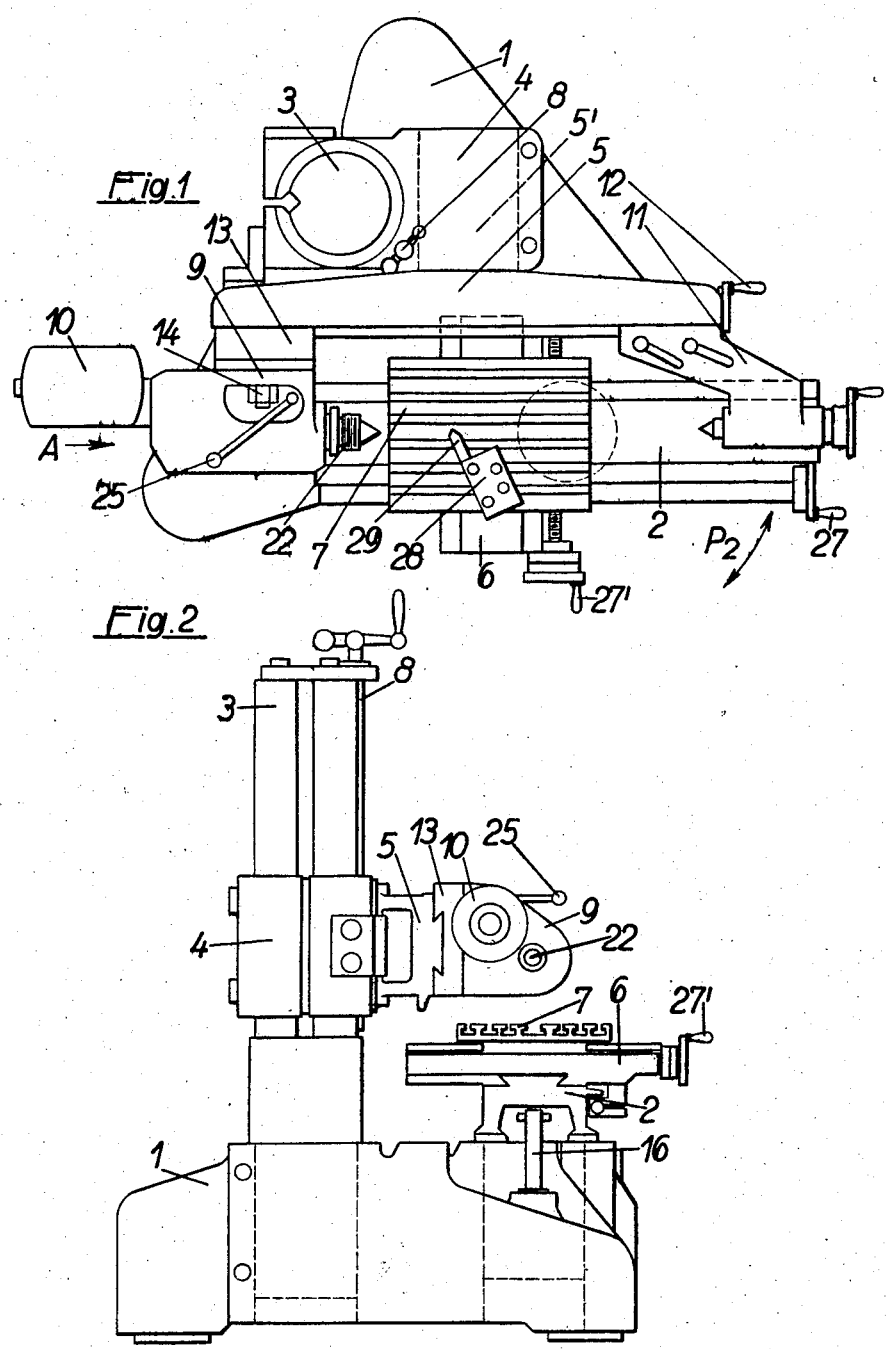

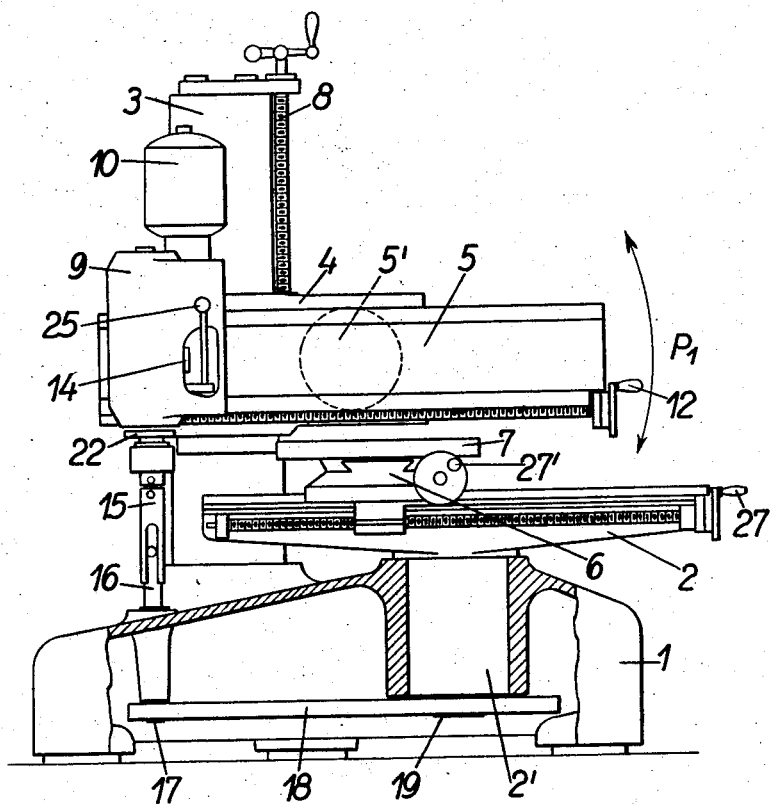

United States Patent Office 2,844,062
Patented July 22, 1958

2,844,062

LATHE

Stefan Jakoblits, Vienna, Austria, assignor to Schiesel & Co. Gesellschaft m. b. H., Vienna, Austria, a corporation of Austria Application April 30, 1956, Serial No. 581,614

Claims priority, application Austria May 3, 1955

13 Claims. (Cl. 82—2)

This invention relates to a multi-purpose machine tool.

So-called multi-purpose machine tools are known which are suitable for several operations, e. g., for turning, milling, drilling and grinding. These machine tools are set up for the several operations by a reassembly of the several units, such as headstock, slide rest, motor, T-slot plate etc. The repeated reassembly, however, is time consuming and always involves the danger of damage to the several units, which are in most cases unhandy and delicate. The accuracy of the machine is also reduced by the resulting wear.

The setting up of the multi-purpose machine tool according to the invention for the several operations is not effected by a complicated reassembly of the several units but by a simple swinging or change-over thereof, whereas the units need not be removed from the machine.

The multi-purpose machine tool according to the invention comprises a horizontal support, a vertical support, two guide members each of which is provided with a guide portion on one side and is rotatably mounted on one of said supports, fixing means for fixing each of said guide members relative to its support in various angular positions, and two carriers, each of which is arranged to be guided on said guide portion of one of said guide members, said carriers comprising a tool carrier and a workpiece carrier, and is characterized in that each of said guide members is provided with a shaft stub on the side opposite to said guide portion, which shaft stub is rotatably mounted in the respective support.

In the accompanying drawings, in which an illustrative embodiment of the invention is shown, all details which do not belong to the invention, such as automatic feed, thread cutting device, dials, dial indicators, and the like, have been omitted for greater clarity. Fig. 1 is a top plan view of the machine (set up as a lathe), Fig. 2 a side view taken in the direction of the arrow A in Fig. 1, Fig. 3 a partly sectional front view (as a vertical lathe), Fig. 4 a detail (base plate) and Fig. 5 another detail (headstock).

Figure 4:
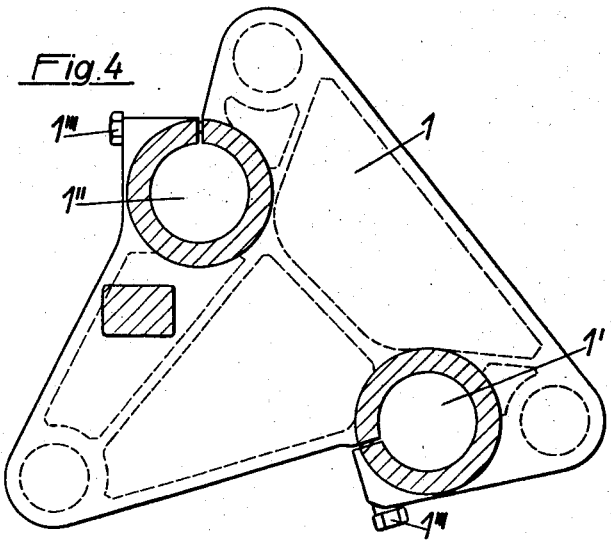

The base plate 1 (Figs. 1–4) has two bores 1' and 1". A guide member 2 for a tool carrier or workpiece carrier is horizontally rotatably carried by means of a shaft stub 2' in the bore 1'. A rotary column 3 is inserted in the bore 1". The bores 1' and 1" of the base plate 1 are slotted to enable the guide 2 and rotary column 3 to be clamped in the respective desired position by a tightening of clamp screws 1''' (Fig. 4).

The rotary column 3 carries a bearing block 4 (Figs. 1–3), which is vertically slidable by means of the vertical spindle 8 and in which a guide member 5, which is similar to the guide member 2 and serves for receiving the units slidably arranged thereon (headstock and tailstock), is pivotally mounted with its shaft stub 5' so that it can be swung about the same like a balance beam (see arrow P1). In this connection it does not make a difference whether the guide members 2 and 5 have guide portions of dovetail or prismatic or another shape.

The guide member 2 carries a cross slide rest 6, which is slidable by means of the crank handle 27 and which is used as required as a tool carrier or workpiece carrier. That slide rest has a large T-slot fixing plate 7 instead of the usual lathe tool gripping means. The fixing plate 7 serves for fixing the machining tool (drilling, milling, grinding or filling) instead of the tool holder 28 with its lathe tool 29 (Fig. 1) without special preparations. In that case the headstock spindle 22 of the headstock 9, 10 receives the respective tool (drill, milling cutter and the like), which is not shown here, by means of a chuck which is screwed in a known manner on the thread of the headstock spindle 22. That T-slot plate 7 protects at the same time the guide portion of the guide member 2 to a considerable extent from chips.

The guide member 5 (Figs. 1–3), is pivotally mounted like a balance beam with its shaft stub 5' in the bearing block 4, which can be slidably moved up and down by means of the vertical spindle 8. The guide member 5 carries the headstock 9 with its motor 10 and the tailstock 11 in such a manner that the cross slide rest 6, 7 can move below both the headstock and the tailstock. At the same time the guide member 2 carrying the cross slide rest 6, 7 may be horizontally turned below the guide member 5 and its units (headstock 9, 10 and tailstock 11).

The headstock 9 carrying the motor 10 is affixed on its base 13 by means of the threaded bolt 14 and is rotatable through 360 deg. about the same. The headstock base 13 is arranged to be slidably moved on the guide member 5 by means of the crank handle 12. In the vertical position of the headstock 9, 10 the same may be used as a vertical drilling or milling unit or, as is apparent from Fig. 3, as a drive means for an operation which will be described hereinafter. Since the guide member 5 is pivotally movable about its shaft stub 5' and can be fixed in any angular position (see arcuate arrow P1, Fig. 3), the headstock 9, 10 can be used for drilling, milling or grinding in any angular position, using a corresponding tool (drill, milling cutter or grinding disc) affixed in the headstock spindle 22.

Fig. 3 is a partly sectional view showing a special use of this multi-purpose workshop machine, namely, as a vertical lathe. It is apparent that the headstock 9, 10 is vertically arranged and drives by means of a detachably arranged connecting shaft 15 a back gear shaft 16, which is freely rotatably mounted in the base plate 1 and carries at its lower end a sprocket wheel or a belt pulley. That back gear shaft imparts by means of a gear chain or a belt 18 and a large sprocket wheel or a belt pulley 19 a horizontal rotation at a correspondingly reduced speed (see arcuate arrow P2, Fig. 1) to the guide member 2 rotating about its shaft stub 2', which is freely rotatably mounted in the bore 1' of the base plate. To this end the clamping in the bearing 1' is previously loosened by untightening the clamping screws 1''' (Fig. 4).

This affords the advantage that a larger workpiece, which cannot be gripped in the headstock in the usual manner, can now be clamped on the T-slot plate 7 of the cross slide rest 6 and can accurately be centered thereby. The throw of an eccentric of crank pin to be rotated during machining may also be adjusted just as simply and accurately by means of the crank handle 27, 27'.

When the detachably arranged connecting shaft 15 is removed and the headstock 9, 10 is adjusted to a horizontal position, taper-turning can be performed throughout the length of the guide member 2, i. e. throughout the turning length, because the guide member 2 can be fixed in the bore 1' of the base plate 1 by means of the shaft stub 2' in any angular position.

Figure 5:
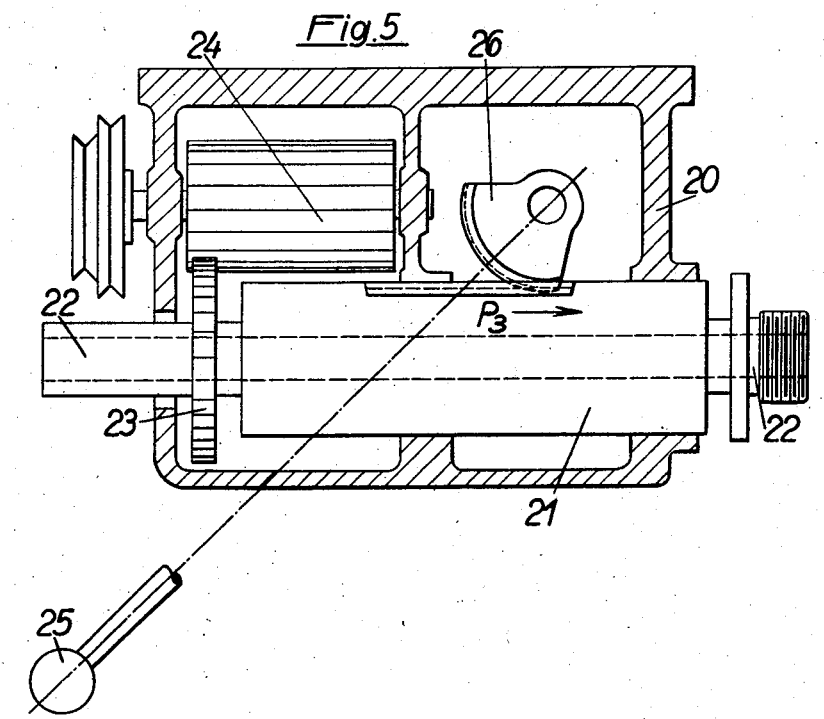

Fig. 5 is a sectional view of the headstock 9 without motor 10. The housing 20 contains the bearing sleeve 21, which is slidably guided in the direction of the arrow P3 and has the headstock spindle 22 freely rotatably mounted therein in a manner known. The headstock spindle 22 has affixed to its rear end a gear 23, which is in mesh with the motor-driven toothed roll 24 parallel to the same. The feed of the headstock spindle 22 in the direction of the arrow is effected in a known manner by means of a hand lever 25, which moves the toothed segment 26 in mesh with an appropriate toothing provided on the bearing sleeve 21 carrying the headstock spindle 22. It is the purpose of this arrangement to achieve that the headstock spindle 22 while driven by the toothed roll 24 can be fed with great ease and sensitivity because the force holding the headstock spindle 22 in rotation is not applied to the small radius of the headstock spindle 22 itself, as it is in the case of the previously usual sliding wedge arrangement, so that a large frictional pressure bears on the sliding flank, but all tooth flanks of the toothed roll 24 and of the large gear 23 of the headstock spindle act in continual alternation as sliding flanks so that the frictional pressure is reduced, owing to the large radius of the gear 23, and the feed force required is also of correspondingly small magnitude.

What is claimed is:

1. A multi-purpose machine tool, comprising two guide members each of which is provided with a guide portion on one side and with a shaft stub on the opposite side, a horizontal support having said shaft stub of one of said guide members rotatably mounted therein, a vertical support connected to said horizontal support and having said shaft stub of the other of said guide members rotatably mounted therein, fixing means for fixing each of said guide members relative to its support in various angular positions, and two carriers, each of which is arranged to be guided on said guide portion of one of said guide members, one of said carriers comprising a headstock and the other of said carriers comprising a cross slide rest.

2. A machine tool as set forth in claim 1, in which said horizontal support has a vertical bore in which the shaft stub of said one guide member is mounted for rotation through 360 deg. in a horizontal plane, said fixing means being adapted to fix said one guide member in any desired angular position.

3. A machine tool as set forth in claim 2, in which said cross slide rest is arranged to be guided on the guide portion of said guide member the shaft stub of which is mounted in said vertical bore for rotation through 360 deg. in a horizontal plane.

4. A machine tool as set forth in claim 1, in which said horizontal support has a vertical bore and said vertical support comprises a column inserted in said vertical bore for rotation through 360 deg., a bearing block vertically slidably arranged on said column and means for fixing said bearing block relative to said column in any desired vertical position, said bearing block being formed with a horizontal bore in which the shaft stub of said other guide member is rotatably mounted, said machine tool comprising means for fixing said column relative to said horizontal support in any desired angular position.

5. A machine tool as set forth in claim 4, in which said guide portion of said guide member the shaft stub of which is rotatably mounted in said horizontal bore of said bearing block vertically slidably arranged on said column extends substantially throughout the length of the machine tool and said headstock is arranged on said guide portion of said last-mentioned guide member.

6. A machine tool as set forth in claim 5, which comprises a tailstock arranged to be guided on said guide portion of said guide member the shaft stub of which is rotatably mounted in said horizontal bore of said bearing block vertically slidably arranged on said column.

7. A machine tool as set forth in claim 1, in which the shaft stub of said one guide member has its lower end arranged in a protected location in said horizontal support and which comprises a drive member affixed to said lower end of said shaft stub, power-operable means operatively connected to said drive member for rotating said one guide member, a cross slide rest constituting the carrier arranged to be guided on the guide portion of said one guide member, and a fixing plate adapted to have a workpiece clamped thereon and carried by said cross slide rest.

8. A machine tool as set forth in claim 7, in which said drive member comprises a gear-wheel.

9. A machine tool as set forth in claim 7, in which said drive member comprises a belt pulley.

10. A machine tool as set forth in claim 7, which comprises a headstock constituting the carrier arranged to be guided on the guide portion of said other guide member and a motor carried by said headstock and arranged to operate said power-operable means.

11. A machine tool as set forth in claim 10, which comprises a headstock spindle carried by said headstock and arranged to be driven by said motor, and in which said power-operable means comprise a reducing gear arranged to drive said drive member, and a detachably arranged connecting shaft operatively connecting said headstock spindle to said reducing gear.

12. A machine tool as set forth in claim 11, in which said headstock spindle is arranged to drive said connecting shaft when said other guide member has been turned to adjust said headstock spindle to a vertical position.

13. A machine tool which comprises a headstock, a spindle sleeve contained in said headstock, a headstock spindle freely rotatably mounted in said spindle sleeve, a power-operable toothed roll rotatably mounted in said head stock, and a gear wheel affixed to said headstock spindle and in slidable engagement and in mesh with said toothed roll to enable said head stock spindle to be slidably moved in said spindle sleeve and to be driven by said toothed roll at the same time.

References Cited in the file of this patent

UNITED STATES PATENTS

| 209,361 | Sandmeyer | Oct. 29, 1878 |
| 237,487 | Conklin | Feb. 8, 1881 |
| 762,647 | Mullinnix | June 14, 1904 |
| 874,507 | Highsmith | Dec. 24, 1907 |
| 2,341,061 | Rhodes | Feb. 8, 1944 |

UNITED STATES PATENT OFFICE

CERTIFICATE OF CORRECTION

Patent No. 2,844,062                                            July 22, 1958

Stefan Jakoblits

It is hereby certified that error appears in the above numbered patent requiring correction and that the said Letters Patent should read as corrected below.

In the grant, line 2, and line 12, and in the heading to the printed specification, lines 3 and 4, name of assignee, for "Schiesel & Co. Gesellschaft m. b. H.", in each occurrence, read -- Schiessl & Co. Gesellschaft m. b. H. --.

Signed and sealed this 2nd day of December 1958.

(SEAL)

Attest:
KARL H. AXLINE

Attesting Officer

ROBERT C. WATSON
                                                                                              Commissioner of Patents